United States Patent
Seo

(10) Patent No.: US 9,978,520 B2
(45) Date of Patent: May 22, 2018

(54) MULTILAYER CERAMIC CAPACITOR AND METHOD OF MANUFACTURING THE SAME

(71) Applicant: SAMSUNG ELECTRO-MECHANICS CO., LTD., Suwon-si, Gyeonggi-do (KR)

(72) Inventor: Sung Soo Seo, Suwon-si (KR)

(73) Assignee: SAMSUNG ELECTRO-MECHANICS CO., LTD., Suwon-si, Gyeonggi-Do (KR)

(*) Notice: Subject to any disclaimer, the term of this patent is extended or adjusted under 35 U.S.C. 154(b) by 0 days. days.

(21) Appl. No.: 15/260,639

(22) Filed: Sep. 9, 2016

(65) Prior Publication Data

US 2017/0186544 A1 Jun. 29, 2017

(30) Foreign Application Priority Data

Dec. 29, 2015 (KR) .................. 10-2015-0188693

(51) Int. Cl.

| H01G 4/30 | (2006.01) |
|---|---|
| H01G 4/008 | (2006.01) |
| H01G 4/12 | (2006.01) |
| H01G 4/232 | (2006.01) |
| H01G 4/012 | (2006.01) |

(52) U.S. Cl.
CPC ............ *H01G 4/30* (2013.01); *H01G 4/008* (2013.01); *H01G 4/0085* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS

| 9,082,548 B2 * | 7/2015 | Masuda | H01G 4/01 |
|---|---|---|---|
| 2003/0062112 A1 | 4/2003 | Matsumoto | |
| 2008/0137264 A1 * | 6/2008 | Suzuki | H01G 4/0085 |
| | | | 361/321.3 |
| 2009/0052110 A1 * | 2/2009 | Masuda | H01G 4/005 |
| | | | 361/303 |

(Continued)

FOREIGN PATENT DOCUMENTS

| JP | 2003-173925 A | 6/2003 |
|---|---|---|
| KR | 10-2015-0082936 A | 7/2015 |

*Primary Examiner* — Dion R Ferguson
(74) *Attorney, Agent, or Firm* — McDermott Will & Emery LLP

(57) ABSTRACT

A multilayer ceramic capacitor includes a body portion and an external electrode. The body portion has an active region in which capacitance is formed by a plurality of stacked internal electrodes having dielectric layers therebetween, a cover region disposed above the topmost and below the bottommost internal electrodes, and a side margin region disposed laterally adjacent to the active region. The plurality of internal electrodes are not formed in the cover and side margin regions. The body portion may have different additive concentrations depending on a thickness direction, and a concentration of the additive in a region of the side margin laterally adjacent to a dielectric layer of the body portion may be higher than a concentration of the additive in another region of the side margin laterally adjacent to an internal electrode of the body portion.

22 Claims, 6 Drawing Sheets

(56) References Cited

U.S. PATENT DOCUMENTS

| | | | | |
|---|---|---|---|---|
| 2012/0077095 A1* | 3/2012 | Roumi | ................... | H01G 11/02 |
| | | | | 429/405 |
| 2013/0342956 A1* | 12/2013 | Konishi | ................. | H01G 4/005 |
| | | | | 361/301.4 |
| 2014/0016254 A1* | 1/2014 | Strout | ................... | B60S 1/0491 |
| | | | | 361/679.01 |
| 2016/0104576 A1* | 4/2016 | Park | ..................... | H01G 4/1227 |
| | | | | 361/301.4 |

\* cited by examiner

A-A'

B-B'

MULTILAYER CERAMIC CAPACITOR AND METHOD OF MANUFACTURING THE SAME

CROSS-REFERENCE TO RELATED APPLICATION

This application claims the benefit of Korean Patent Application No. 10-2015-0188693 filed on Dec. 29, 2015, with the Korean Intellectual Property Office, the disclosure of which is incorporated herein by reference.

BACKGROUND

The present disclosure relates to a multilayer ceramic capacitor and a method of manufacturing the same.

Multilayer ceramic capacitors are used in a wide range of electronic products. Further, as multilayer ceramic capacitors are used in electronic devices providing a variety of different functions and requiring high degrees of reliability, the multilayer ceramic capacitors themselves require high degrees of reliability.

To improve the reliability of multilayer ceramic capacitors, there is a need to secure structural stability in multilayer ceramic capacitors. For this purpose, the occurrence of defects in ceramic body portions of multilayer ceramic capacitors, in internal electrodes thereof, and the like, needs to be considerably reduced.

A range of factors cause defects in the body portion, the internal electrodes, or the like in a multilayer ceramic capacitor. Among these factors, a difference in sintering rates due to a difference in sintering temperatures of materials forming the internal electrode and the body portion commonly causes defects. That is, the internal electrodes and the body portion may respectively be formed of metal and ceramic as main components, and therefore during sintering, the internal electrode may first be sintered and then the ceramic may be sintered. Therefore, when the sintering temperature is adjusted, based on the internal electrode, defects such as pores due to non-sintered portions may be increased in a margin region of a cover or a side. On the contrary, when the sintering temperature is adjusted based on the material of the body, the internal electrodes may be over-sintered and therefore, an electrode agglomeration phenomenon may occur.

SUMMARY

An aspect of the present disclosure may provide a multilayer ceramic capacitor having improved reliability by reducing problems of over-sintering of an internal electrode or the occurrence of defects in an interior of a body portion by considerably reducing a difference between sintering rates of a dielectric material forming the body portion and an internal electrode disposed in the body portion.

Another aspect of the present disclosure may also provide a method of manufacturing a multilayer ceramic capacitor having high reliability.

According to an aspect of the present disclosure, a multilayer ceramic capacitor may include a body portion and an external electrode. The body portion has a plurality of internal electrodes stacked therein in a thickness direction and includes a dielectric material disposed between adjacent internal electrodes. The external electrode is formed on exterior surfaces of the body portion and is electrically connected to a plurality of the internal electrodes. The body portion may include a capacitance forming region in which capacitance is formed by the plurality of internal electrodes, a cover region disposed above or below the capacitance forming region in the thickness direction, and a side margin region disposed beside the capacitance forming region in a width direction orthogonal to the thickness direction and free of the plurality of internal electrodes. The side margin region includes an additive having an additive concentration that varies in the thickness direction between a first concentration in regions of the side margin region adjacent to the dielectric material of the body portion in the width direction and a second concentration lower than the first concentration in regions of the side margin region adjacent to internal electrodes of the plurality of internal electrodes in the width direction.

According to another aspect of the present disclosure, a method of manufacturing a multilayer ceramic capacitor may include preparing a plurality of green sheets each having an internal electrode pattern disposed thereon, and stacking the plurality of green sheets to form a laminate. The laminate is sintered to form a body portion. Each internal electrode pattern and each green sheet may include an additive of a same material, and the preparing of each green sheet of the plurality of green sheets may include sequentially stacking second and third sheets on a first sheet.

According to another aspect of the present disclosure, a multilayer ceramic capacitor includes a plurality of internal electrodes stacked in a thickness direction, and a plurality of dielectric layers each disposed between a respective pair of adjacent internal electrodes of the stacked plurality of internal electrodes. Each of the internal electrodes and dielectric layers includes a same ceramic additive having a sintering temperature higher than a sintering temperature of a conductive metal material included in the internal electrodes.

According to a further aspect of the present disclosure, a method includes forming an internal electrode pattern on each of a plurality of dielectric sheets, stacking the plurality of dielectric sheets having the internal electrode patterns formed thereon, and sintering the stack of the plurality of dielectric sheets having the internal electrode patterns formed thereon. Each of the internal electrode patterns and dielectric sheets includes a same ceramic additive having a sintering temperature higher than a sintering temperature of a conductive metal material included in the internal electrode patterns.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
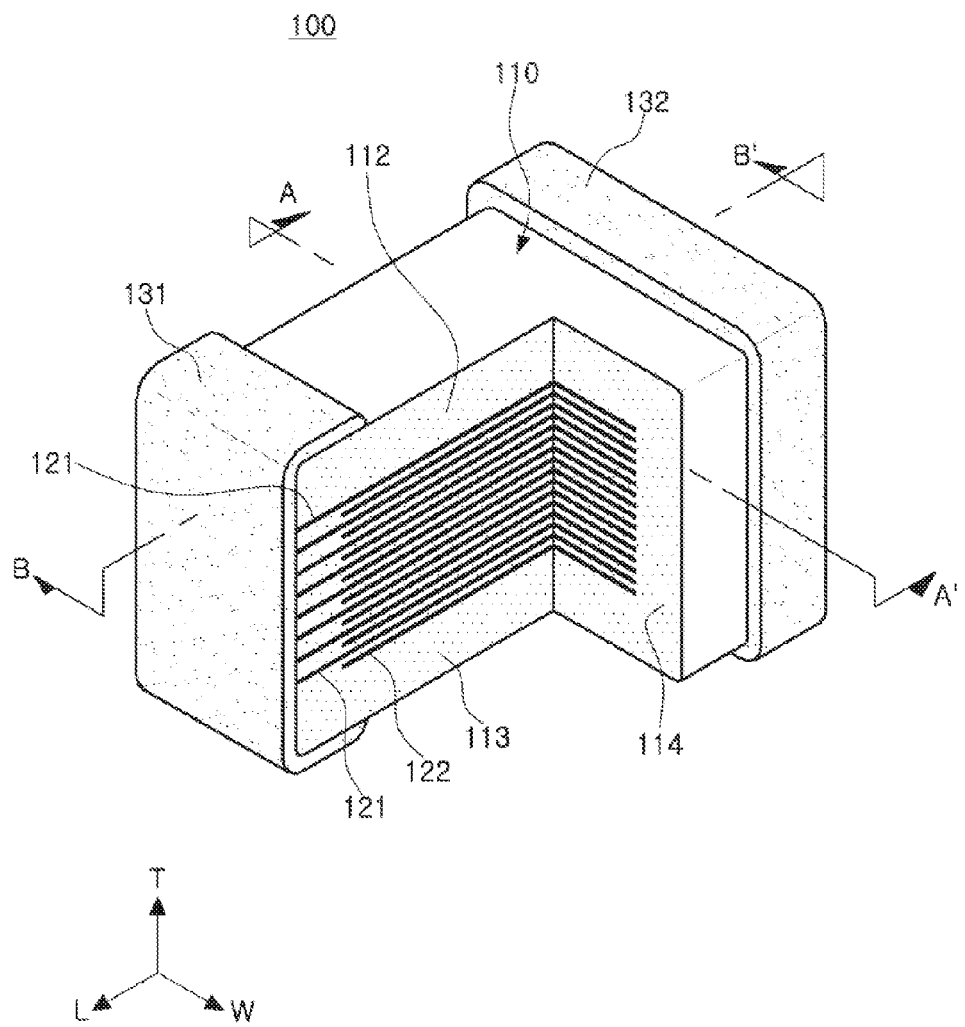
FIG. 1 is a partially cut-away perspective view schematically illustrating a multilayer ceramic capacitor according to an exemplary embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region, or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers, and/or sections, these members, components, regions, layers, and/or sections should not be limited by these terms. These terms are only used to distinguish one member, component, region, layer, or section from another member, component, region, layer, or section. Thus, a first member, component, region, layer, or section discussed below could be termed a second member, component, region, layer, or section without departing from the teachings of the exemplary embodiments.

Spatially relative terms, such as "above," "upper," "below," "lower," and the like, may be used herein for ease of description to describe one element's positional relationship relative to one or more other elements as shown in the figures. It will be understood that the spatially relative terms are intended to encompass different orientations of the device in use or operation in addition to the orientation depicted in the figures. For example, if the device in the figures is turned over, elements described as "above" or "upper" relative to other elements would then be oriented "below" or "lower" relative to the other elements or features. Thus, the term "above" can encompass both the above and below orientations depending on a particular direction of the devices, elements, or figures. The device may be otherwise oriented (rotated 90 degrees or at other orientations) and the spatially relative descriptors used herein may be interpreted accordingly.

The terminology used herein is for describing particular illustrative embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, members, elements, and/or groups, but do not preclude the presence or addition of one or more other features, integers, steps, operations, members, elements, and/or groups.

Hereinafter, embodiments of the present disclosure will be described with reference to schematic views illustrating embodiments of the present disclosure. In the drawings, components having ideal shapes are shown. However, variations from these ideal shapes, for example due to variability in manufacturing techniques and/or tolerances, also fall within the scope of the disclosure. Thus, embodiments of the present disclosure should not be construed as being limited to the particular shapes of regions shown herein, but should more generally be understood to include changes in shape resulting from manufacturing methods and processes. The following embodiments may also be constituted by one or a combination thereof.

The present disclosure describes a variety of configurations, and only illustrative configurations are shown herein. However, the disclosure is not limited to the particular illustrative configurations presented herein, but extends to other similar/analogous configurations as well.

Hereinafter, a capacitor according to the present disclosure will be described.

Multilayer Ceramic Capacitor

Figure 2:
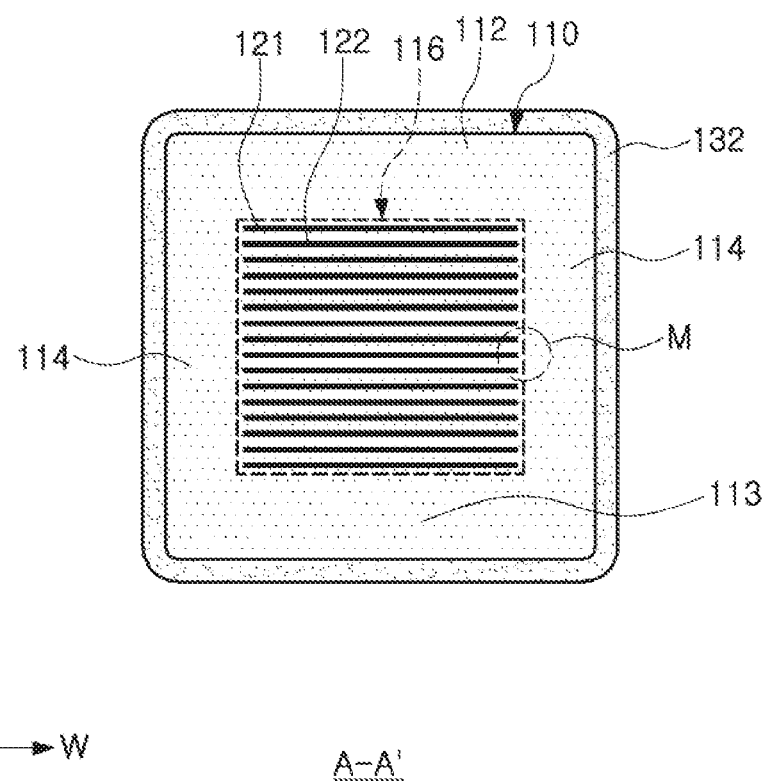
FIGS. 2 and 3 are schematic cross-sectional views of the multilayer ceramic capacitor of FIG. 1 and correspond to cross-sectional views taken along lines A-A' and B-B', respectively.
Figure 3:
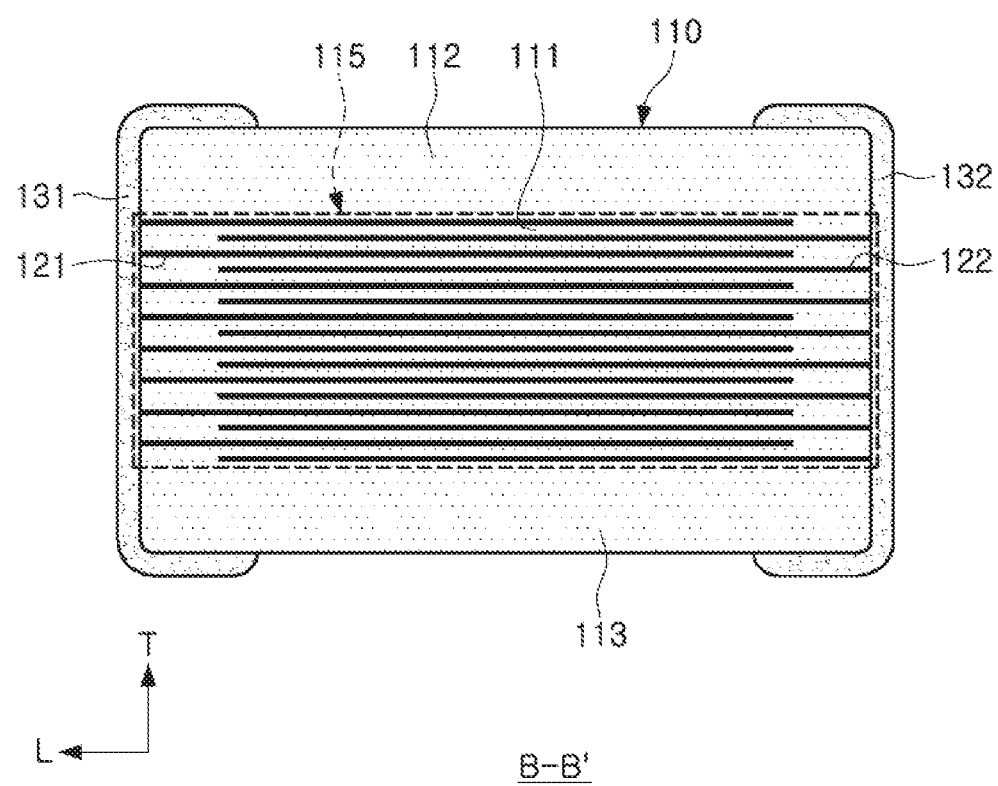

FIG. 1 is a partially cut-away perspective view schematically illustrating a multilayer ceramic capacitor according to an exemplary embodiment. FIGS. 2 and 3 are schematic cross-sectional views of the multilayer ceramic capacitor of FIG. 1 and correspond to cross-sectional views taken along lines A-A' and B-B', respectively.

Referring to FIGS. 1 through 3, a multilayer ceramic capacitor 100 according to an exemplary embodiment may include a plurality of internal electrodes 121 and 122 stacked therein, a body portion 110 including a dielectric material, and external electrodes 131 and 132. In this case, the body portion 110 may be divided into an active region 115 and cover regions 112 and 113. Directions of the body portion 110 will be defined in order to clearly describe exemplary embodiments. Length (L), width (W), and thickness (T) directions identified in the accompanying drawings refer to a length direction, a width direction, and a thickness direction, respectively. In this case, the thickness direction T may be defined as a direction in which the plurality of internal electrodes 121 and 122 are stacked.

The body portion 110 may be formed of a plurality of dielectric layers 111 that are stacked and, as described below, may be obtained by stacking and sintering a plurality of green sheets. The plurality of dielectric layers 111 may be integrated together through sintering. A shape and dimensions of the body portion 110, and the number of stacked dielectric layers 111 forming the body portion 110, are not limited to the example illustrated in the present exemplary embodiment. In the example illustrated in FIG. 1, the body portion 110 may have a rectangular parallelepiped shape, but other body portion shapes may also be used.

The dielectric layers 111 included in the body portion 110 may contain a high-k ceramic material, for example, a barium titanate ($BaTiO_3$)-based or a strontium titanate ($SrTiO_3$)-based material. However, the layers may also use other materials known in the art capable of obtaining sufficient capacitance. The dielectric layers 111 may further include, if necessary, an additive, an organic solvent, a plasticizer, a binder, a dispersant, or the like in addition to the ceramic material that is a main component. In this regard, the dielectric layer 111 may contain the same material as that added to the internal electrodes 121 and 122 as an additive. As described below, the concentration of additives may be locally controlled appropriately to secure uniform sintering characteristics.

The internal electrodes 121 and 122 may be connected to different respective external electrodes 131 and 132 to have different polarities upon driving. As described below, the internal electrodes 121 and 122 may be obtained by printing a paste including conductive metal on one surface of the ceramic green sheets at a predetermined thickness and then sintering the paste. In this case, as illustrated in FIGS. 1 and 3, the internal electrodes 121 and 122 may be alternately exposed through both cross sections thereof along the stacked direction and may be electrically separated from each other by the dielectric layers 111 disposed therebetween. For examples, internal electrodes 121 may be exposed to a first end surface of the body portion 110, and the internal electrodes 122 may be exposed to a second end surface of the body portion 110 that is disposed opposite to the first end surface in the length (L) direction.

An example of main materials forming the internal electrodes 121 and 122 may include nickel (Ni), copper (Cu), palladium (Pd), silver (Ag), or the like, and alloys thereof may also be used. In addition to the metal components, the internal electrodes 121 and 122 may include some other additives. For example, the ceramic additive may be added along with the metal component. The ceramic additive may serve to delay the sintering of the internal electrodes 121 and 122 during the manufacturing process. Some of the ceramic additive may be diffused to the adjacent dielectric layers 111 upon sintering. A representative example of the ceramic additive performing the sintering delay function may include MgO but other ceramic materials (for example, $Al_2O_3$, $SiO_2$, ZnO, or the like) may also be used. As described below, the concentration of the ceramic additive may be non-uniform in the adjacent dielectric layers 111 due to the diffusion movement of the ceramic additive, such that the sintering characteristics may be locally changed.

The external electrodes 131 and 132 may be formed on exterior surfaces of the body portion 110 to respectively be electrically connected to the internal electrodes 121 and 122. The external electrodes 131 and 132 may be formed by a method of forming a material including a conductive metal as a paste and then applying the paste to the body portion 110, or the like and an example of the conductive metal may include nickel (Ni), copper (Cu), palladium (Pd), gold (Au), or alloys thereof.

According to the present exemplary embodiment, the concentrations of the components of additives included in the internal electrodes 121 and 122 may be different in the body portion 110 depending on the region, which may have a structure obtained by appropriately controlling the amount of additive included in the ceramic green sheet to make the sintering characteristics uniform over the whole of the body portion 110.

Describing this in detail, the body portion 110 may include the active region 115, in which capacity is formed by the internal electrodes 121 and 122, and the cover regions 112 and 113 disposed on both sides of the active region 115 in the thickness direction. For example, the cover regions 112 and 113 can be disposed at the upper and lower surfaces of the body portion 110 in the thickness (T) direction, as illustrated in FIGS. 1 through 3. In the active region 115, a portion disposed laterally outwards (in the width (D) direction) from the internal electrodes 121 and 122 and forming an exterior, that is, the region in which the internal electrodes 121 and 122 are not formed, is known as the side margin region 114 shown in FIGS. 1 and 2.

The cover regions 112 and 113 may serve to prevent the first and second internal electrodes 121 and 122 from being damaged due to a physical or chemical stress. The cover regions 112 and 113 may have substantially the same material and configuration as the dielectric layers 111 of the active region 115 other than the fact that the cover regions 112 and 113 do not include the internal electrodes 121 and 122. In this case, the cover regions 112 and 113 may be simultaneously formed or obtained by the green sheet stacking and sintering method. The cover regions 112 and 113 may each be implemented by stacking at least one or two green sheets on the upper and lower surfaces of the active region 115 and sintering the stacked green sheets.

In the present exemplary embodiment, the side margin region 114 has different additive concentrations that vary depending on the thickness direction T. For example, the additive concentrations in the side margin region 114 may be adjusted such that the concentration of additives of the green sheets is controlled to allow the sintering temperature to be uniform in the entirety of the body portion 110. In this case, the same additive included in the internal electrodes 121 and 122, for example, MgO, or the like, may be used as the components of additives included in the side margin region 114 for sintering delay.

Figure 4:
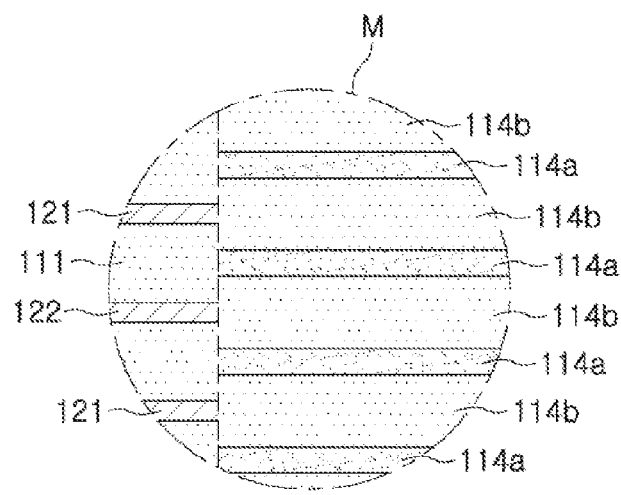
FIG. 4 is an enlarged view of a boundary (M region) between a capacitance formation region and a side margin region in an active region of FIG. 2.
Figure 5:
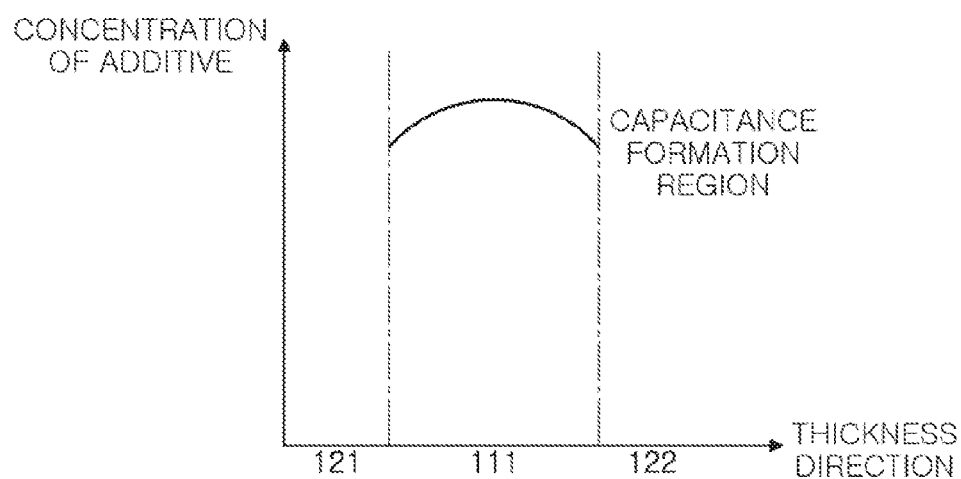
FIG. 5 is a graph schematically illustrating concentration distributions of additives in a thickness direction in a dielectric layer of the capacitance formation region of the active region.
Figure 6:
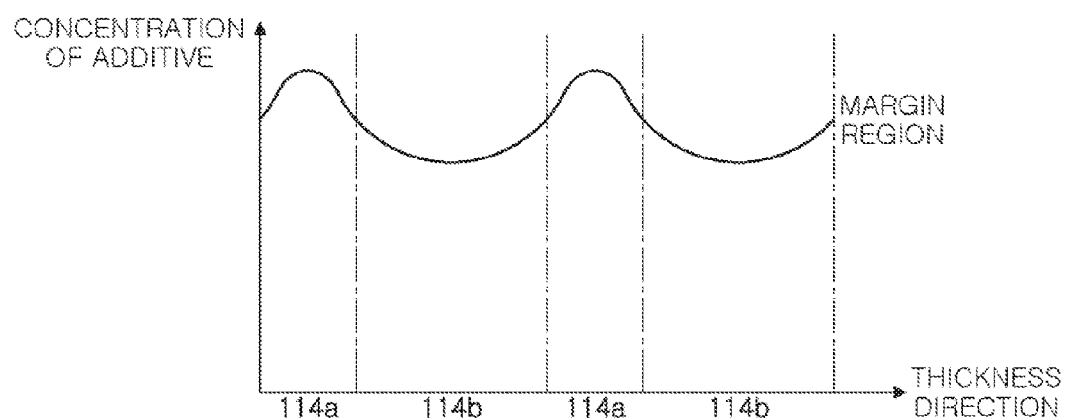
FIG. 6 is a graph schematically illustrating concentration distributions of additives in a thickness direction in a dielectric layer of the side margin region of the active region.

The concentration properties of the additive of the side margin region 114 will be described in more detail with reference to FIGS. 4 through 6. FIG. 4 is an enlarged view of a boundary (M region) between a capacitance formation region 116 and a side margin region 114 in an active region 115 of FIG. 2. FIG. 5 is a graph schematically illustrating concentration distributions of additives in a thickness direction in a dielectric layer 111 of the capacitance formation region 116 of the active region 115. FIG. 6 is a graph schematically illustrating concentration distributions of additives in a thickness direction in a dielectric layer 111 of the side margin region 114 of the active region 115.

According to the present exemplary embodiment, the side margin region 114 may include a plurality of alternately stacked regions 114a and 114b, as shown in FIG. 4. In detail, the stacked regions 114a and 114b are such that regions 114b are disposed within the side margin region 114 to be adjacent to positions (in the thickness (T) direction) corresponding to the internal electrodes 121 and 122. In this regard, each region 114b is adjacent to a corresponding internal electrode 121 or 122 in the cross-section shown in FIG. 4. In turn, regions 114a are interposed between adjacent regions 114b, and are thus disposed within the side margin region 114 to be disposed between adjacent internal electrodes 121 and 122. FIGS. 4 and 6 show the characteristics that in a case of the side margin region 114, a first concentration of additive in regions 114a, corresponding to a central portion between adjacent internal electrodes among the plurality of internal electrodes 121 and 122, is higher than a second concentration of the additive in a region 114b adjacent to a position corresponding to the internal electrodes 121 and 122. As described below, this concentration distribution may be obtained by relatively increasing the concentration of additives in a green sheet disposed in the middle of three green sheets stacked between the internal electrodes 121 and 122. In turn, during sintering, the additive of the region 114a may show a distribution similar to that of FIG. 6, while being diffused to the adjacent region 114b, or the like.

The capacitance formation region 116 in the active region 115 has concentration distributions of additives different from that of the side margin region 114. Here, the capacitance formation region 116 may be defined as a region contributing to forming capacitance other than the side margin region 114 in the active region 115. For example, the capacitance formation region 116 may correspond to the portion of the active region 115 in which the internal electrodes 121 and 122 are formed. Referring to FIGS. 4 and 5, the dielectric layers 111 included in the capacitance formation region 116 may each have concentrations of an additive that vary according to a position in the thickness direction T. Specifically, the concentration of the additive in the dielectric layers 111 may show a tendency, similar to the side margin region 114, of having a concentration (hereinafter, referred to as 'third concentration') at the central portion in the dielectric layer 111 that is higher than a fourth concentration in the upper and lower portions of the dielectric layer 111 adjacent to the internal electrodes 121 and 122. The additive distribution of the capacitance formation region 116 is thus generally similar to that of the side margin region 114. Here, the concentration of additives of the green sheet disposed at the central portion of the dielectric layer 111 is higher than that of other green sheets of the dielectric layer 111 that are adjacent to the internal electrodes. In this case, by considering that the side margin region 114 and the capacitance formation region 116 are not separately manufactured, but are instead formed in a same process step and are classified as distinct parts of the body portion 110 depending on the region in which the internal electrodes 121 and 122 are present, the additive distribution characteristics may be understood.

According to the present exemplary embodiment, the foregoing concentration distributions in the side margin region 114 (as illustrated in FIG. 6) and in the capacitance formation region 116 (as illustrated in FIG. 5) may be different from each other. In detail, referring to FIGS. 5 and 6, the difference between the first and second concentrations in the side margin region 114 is larger than the different between the third and fourth concentrations in the capacitance formation region 116. The reason why the concentration gradient in the side margin region 114 is larger than the concentration gradient in the capacitance formation region 116, even when the concentration is obtained by the same green sheet, is that the additive is diffused from the internal electrodes 121 and 122 in the capacitance formation region 116. That is, as described above, the additive (such as a ceramic provided to delay the sintering) may be included in the internal electrodes 121 and 122 in addition to the metal component, and the additive may be diffused from the internal electrodes 121 and 122 to the adjacent green sheets forming the dielectric layer 111 of FIG. 5 after the sintering. Therefore, based on the diffusion of the additive from the internal electrodes 121 and 122 to the region adjacent to the internal electrodes 121 and 122 in the dielectric layer 111, the concentration of additives in the capacitance formation region 116 may higher. Conversely, the concentration (second concentration) of additives in the side margin region 114 may be smaller than the concentration (fourth concentration) of additives in the capacitance formation region 116.

If the concentration distribution of additives is not considered in preparing the green sheet, that is, if the concentration distribution of additives is uniform throughout the thickness (T) direction, the additive distribution may be non-uniform during sintering, due to the additive diffusion from the internal electrodes 121 and 122 as described above. When the additive distribution is non-uniform during the sintering, the sintering characteristics may also be non-uniform. In detail, the region adjacent to the internal electrodes 121 and 122 in the dielectric layer 111 may have the concentration of additives relatively higher than that of the central region, and may therefore show different sintering characteristics from the central region. The foregoing problem, that is, the defect in the body portion 110, the oversintering of the internal electrodes 121 and 122, or the like may occur due to the difference in sintering characteristics.

To solve the problem due to non-uniformity of sintering characteristics, the present exemplary embodiment may dispose green sheets having high concentration of additives in the region corresponding to the center of the dielectric layer 111 between the adjacent internal electrodes 121 and 122 to offset the local increase in the concentration of additives in the region of the dielectric layer 111 adjacent to the internal electrodes 121 and 122 due to the additive diffusion. As a result, the dielectric layer 111 in the capacitance formation region 116 may exhibit relatively uniform sintering characteristics, thereby improving the reliability of the body portion 110.

In this case, as can be confirmed from the graphs of FIGS. 5 and 6, the side margin region 114 (in which the additive diffusion from the internal electrodes 121 and 122 is less pronounced) tends to have a concentration gradient of additives larger than that of the capacitance formation region 116. However, in connection with the reliability of capacitor, characteristics of the capacitance formation region 116 may be more important, and therefore any disadvantage due to the non-uniformity of additive concentrations in the side margin region 114 may be of relatively lesser importance.

Meanwhile, the present exemplary embodiment's description has focused only on the active region 115 in connection with the concentration of additives, but the concentration of additives of the cover regions 112 and 113 may also be controlled in a similar manner. That is, in the regions of the cover regions 112 and 113 that are adjacent to the active region 115, the additive amount may be increased due to the diffusion of additive from the internal electrodes 121 and 122. Therefore, to make the sintering characteristics of the cover regions 112 and 113 uniform as a whole, the green sheets adjacent to the upper and lower portions of the active region 115 may have the lower concentration of additives, while the green sheets stacked in positions relatively far removed from the active region 115 may have relatively higher concentrations of additives.

Method of Manufacturing Multilayer Ceramic Capacitor

Hereinafter, an example of a method of manufacturing a multilayer ceramic capacitor having the foregoing structure will be described with reference to FIGS. 7 and 8. The structure of the multilayer ceramic capacitor may be understood in more detail with reference to the description of the manufacturing method.

Figure 7:
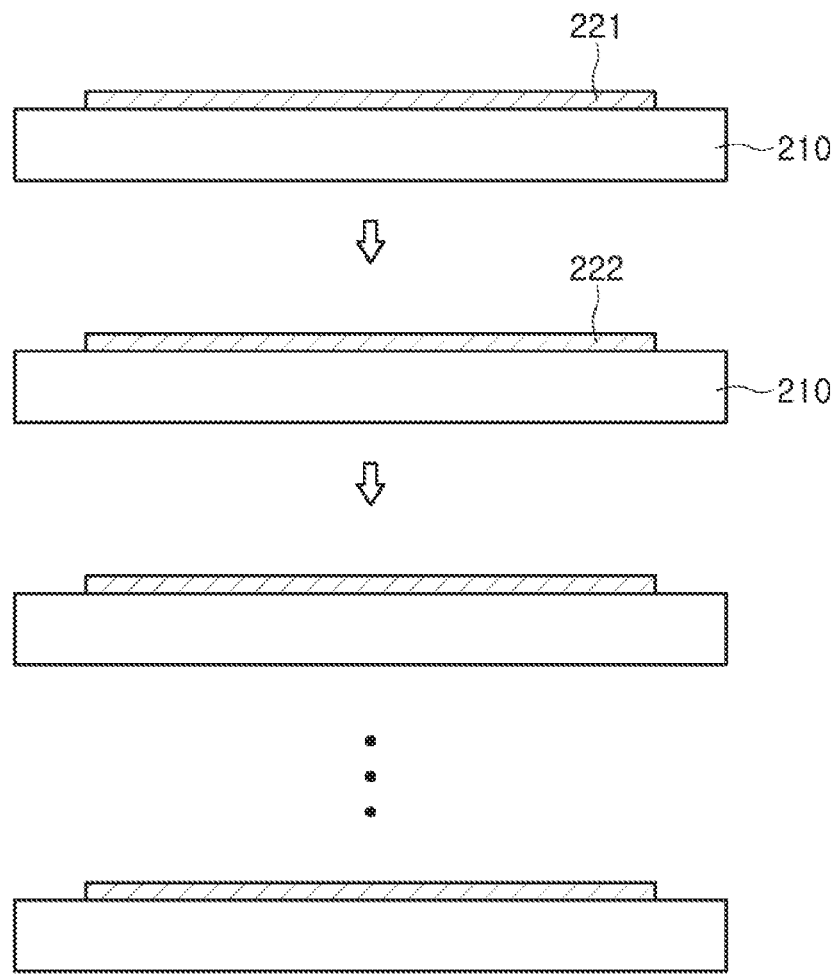
FIG. 7 is a diagram schematically illustrating a method of manufacturing a multilayer ceramic capacitor according to an exemplary embodiment.

FIG. 7 is a diagram schematically illustrating a method of manufacturing a multilayer ceramic capacitor according to an exemplary embodiment. FIG. 8 is a diagram illustrating a structure of a green sheet in the exemplary embodiment of FIG. 7 in detail. The manufacturing method according to the present exemplary embodiment may include preparing a laminate by preparing a plurality of green sheets 210 each having an internal electrode pattern 221 or 222 formed thereon, stacking the plurality of green sheets 210, and forming the body portion 110 by sintering the obtained laminate.

Describing the preparing of the green sheets 210, the green sheets 210 may contain ceramic powder of a barium titanate ($BaTiO_3$)-based material, a lead complex perovskite-based material, strontium titanate ($SrTiO_3$)-based material, or the like and may be added with an organic solvent, an organic binder, or the like. In this case, the green sheet 210 may contain an additive having the same component as an additive of the internal electrode patterns 221 and

222. The additive may be ceramic additives such as MgO added to the internal electrode patterns 221 and 222 to adjust the sintering temperature between the internal electrode patterns 221 and 222 and the green sheet 210.

Figure 8:
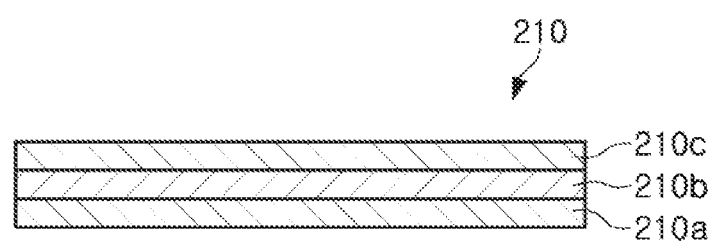
FIG. 8 is a diagram illustrating a structure of a green sheet in the exemplary embodiment of FIG. 7 in detail.

In more detail, as illustrated in FIG. 8, the preparing of each green sheet 210 includes sequentially stacking second and third green sheets 210b and 210c on a first green sheet 210a. In this case, the internal electrode pattern (221 or 222) may be formed or may not be formed on the third green sheet 210c. For example, a third green sheet 210c on which the internal electrode pattern is not formed may be used as the cover region 112 or 113. However, when the green sheet 210 is used as the cover region 112 or 113, as illustrated in FIG. 8, it is not necessary to separate the green sheet 210 into three green sheets 210a, 210b, and 210c and stack the green sheets 210a, 210b, and 210c. Instead, the green sheet forming the cover region 112 or 113 may also include the additive having the same component as that of the additive included in the internal electrode patterns 221 and 222.

The present exemplary embodiment may not use only one sheet to form each green sheet 210, but instead uses the method of stacking at least three green sheets 210a, 210b, and 210c to prepare the green sheet 210 on which the internal electrode patterns 221 and 222 are formed. The reason is that as described above, in a case of the green sheet 210b positioned at the central region (between sheets 210a and 210c) as described above, the green sheet having a relatively higher concentration of additive is used. Therefore, the concentration of additives of the second green sheet 210b may be higher than the concentration of additives of the first and third green sheets 210a and 210c, such that the concentration of additives may be uniform over the whole of the green sheet 210 due to the additive diffusion movement out of the internal electrode patterns 221 and 222 during the following sintering.

Meanwhile, the internal electrode patterns 221 and 222 may use the conductive metal as a main component. The internal electrode patterns 221 and 222 may be provided in the paste form including the additive used for delaying sintering, or the like, and may be formed on the surface of the green sheets 210 by the appropriate printing methods such as a screen printing method and the gravure printing method using a paste. In this case, as the additive included in the internal electrode patterns 221 and 222, a ceramic may be used such as MgO, $Al_2O_3$, $SiO_2$, and ZnO having the sintering temperature higher than that of the metal component used as the main component.

As illustrated in FIG. 7, the body portion 110 may be formed by stacking the plurality of green sheets 210 to prepare the laminate, cutting the laminate in an individual capacitor size, and then performing sintering on the laminate. In this case, the cutting of the laminate in the capacitor size may be performed after the sintering. The sintering may be performed under an N2-H2 atmosphere at, for example, a temperature of 1100 to 1300° C. In this case, the method of manufacturing a multilayer ceramic capacitor may further include plasticizing the green sheet laminate before the sintering. The external electrodes 131 and 132 may be formed on exterior surfaces of the body portion 110 after the sintering, and the foregoing contents or the method used in the art may be used to form the external electrodes 131 and 132 and therefore the detailed description thereof will be omitted.

As set forth above, the multilayer ceramic capacitor according to the exemplary embodiments present herein may considerably reduce the difference between the sintering characteristics of the dielectric material forming the body portion and of the internal electrodes disposed in the body portion. The multilayer ceramic capacitor according to the exemplary embodiments thereby reduce the problems of over-sintering the internal electrodes, the defect occurrence of the interior of the body portion, or the like, and thereby remarkably improve the reliability of the multilayer ceramic capacitors.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor, comprising:
   a body portion having a plurality of internal electrodes stacked therein in a thickness direction and including a dielectric material disposed between adjacent internal electrodes; and
   an external electrode formed on exterior surfaces of the body portion and electrically connected to a plurality of the internal electrodes,
   wherein the body portion includes:
   a capacitance forming region in which capacitance is formed by the plurality of internal electrodes;
   a cover region disposed above or below the capacitance forming region in the thickness direction; and
   a side margin region disposed beside the capacitance forming region in a width direction orthogonal to the thickness direction, and free of the plurality of internal electrodes, and
   wherein the side margin region includes an additive having an additive concentration that varies in the thickness direction between a first concentration in regions of the side margin region adjacent to the dielectric material of the body portion in the width direction and a second concentration lower than the first concentration in regions of the side margin region adjacent to internal electrodes of the plurality of internal electrodes in the width direction.

2. The multilayer ceramic capacitor of claim 1, wherein the additive of the side margin region is also included in the plurality of internal electrodes.

3. The multilayer ceramic capacitor of claim 2, wherein the additive has a sintering temperature higher than a sintering temperature of a material forming the internal electrode.

4. The multilayer ceramic capacitor of claim 2, wherein the additive includes MnO.

5. The multilayer ceramic capacitor of claim 1, wherein the cover region includes the additive of the side margin region.

6. The multilayer ceramic capacitor of claim 1, wherein dielectric layers included in the capacitance formation region between pairs of adjacent internal electrodes, wherein each dielectric layer has an additive concentration of the additive that varies in the thickness direction between a third concentration in a central portion of the dielectric layer between the respective pair of adjacent internal electrodes and a fourth concentration lower than the third concentration in portions of the dielectric layer adjacent to the respective internal electrodes.

7. The multilayer ceramic capacitor of claim 6, wherein a difference between the first and second concentrations is greater than a difference between the third and fourth concentrations.

8. The multilayer ceramic capacitor of claim 6, wherein the second concentration is lower than the fourth concentration.

9. A method of manufacturing a multilayer ceramic capacitor, comprising:
preparing a plurality of green sheets each having an internal electrode pattern disposed thereon;
stacking the plurality of green sheets to form a laminate; and
sintering the laminate to form a body portion,
wherein each internal electrode pattern and each green sheet includes a ceramic additive of a same material, and
the preparing of each green sheet of the plurality of green sheets includes sequentially stacking second and third sheets on a first sheet,
wherein a concentration of the ceramic additive in the second sheet is higher than a concentration of the ceramic additive in the first and third sheets.

10. The method of claim 9, wherein the ceramic additive has a sintering temperature higher than a sintering temperature of a metal component included in the internal electrode pattern.

11. The method of claim 9, wherein the ceramic additive includes MnO.

12. The method of claim 9, further comprising:
forming a cover region by disposing green sheets on which the internal electrode is not formed on upper and lower portions of the laminate.

13. The method of claim 12, wherein the green sheets forming the cover region include the ceramic additive.

14. A method of manufacturing a multilayer ceramic capacitor, comprising:
preparing a plurality of green sheets each having an internal electrode pattern disposed thereon;
stacking the plurality of green sheets to form a laminate; and
sintering the laminate to form a body portion,
wherein each internal electrode pattern and each green sheet includes a ceramic additive of a same material,
the preparing of each green sheet of the plurality of green sheets includes sequentially stacking second and third sheets on a first sheet, and
the preparing of the plurality of green sheets further includes forming the internal electrode pattern on the third sheet of each respective green sheet.

15. A multilayer ceramic capacitor comprising:
a plurality of internal electrodes stacked in a thickness direction; and
a plurality of dielectric layers each disposed between a respective pair of adjacent internal electrodes of the stacked plurality of internal electrodes,
wherein each of the internal electrodes and dielectric layers includes a same ceramic additive having a sintering temperature higher than a sintering temperature of a conductive metal material included in the internal electrodes,
each of the plurality of dielectric layers includes first, second, and third green sheets that are sequentially stacked,
the second green sheet is spaced apart from each internal electrode of the pair of adjacent internal electrodes by the first and third green sheets, and
the second green sheet has a higher concentration of the same ceramic additive than the first and third green sheets.

16. A multilayer ceramic capacitor comprising:
a plurality of internal electrodes stacked in a thickness direction; and
a plurality of dielectric layers each disposed between a respective pair of adjacent internal electrodes of the stacked plurality of internal electrodes,
wherein each of the internal electrodes and dielectric layers includes a same ceramic additive having a sintering temperature higher than a sintering temperature of a conductive metal material included in the internal electrodes,
the multilayer ceramic capacitor includes:
a capacitance forming region in which the plurality of internal electrodes are stacked; and
a side margin region free of the internal electrodes and disposed adjacent to the capacitance forming region in a width direction orthogonal to the thickness direction, and
the side margin region includes a dielectric material and the same ceramic additive, and a concentration of the same ceramic additive varies in the thickness direction through the side margin region.

17. The multilayer ceramic capacitor of claim 16, wherein the concentration of the same ceramic additive in the side margin region is lower at locations laterally outwards from the internal electrodes in the width direction than at locations laterally outwards from the dielectric layers in the width direction.

18. The multilayer ceramic capacitor of claim 17, wherein each of the plurality of dielectric layers has a concentration of the same ceramic additive that varies in the thickness direction, and
the concentration of the same ceramic additive in each dielectric layer is higher in a center of the dielectric layer in the thickness direction than at locations adjacent to surfaces of the dielectric layer contact the internal electrodes.

19. A method comprising:
forming an internal electrode pattern on each of a plurality of dielectric sheets;
prior to stacking the plurality of dielectric sheets, forming each of the plurality of dielectric sheets by sequentially stacking first, second, and third green sheets;
stacking the plurality of dielectric sheets having the internal electrode patterns formed thereon; and
sintering the stack of the plurality of dielectric sheets having the internal electrode patterns formed thereon,
wherein each of the internal electrode patterns and dielectric sheets includes a same ceramic additive having a sintering temperature higher than a sintering temperature of a conductive metal material included in the internal electrode patterns,
the second green sheet has a higher concentration of the same ceramic additive than the first and third green sheets, and
the internal electrode pattern is formed on the third green sheet of each of the plurality of dielectric sheets.

20. A method comprising:
forming an internal electrode pattern on each of a plurality of dielectric sheets;
stacking the plurality of dielectric sheets having the internal electrode patterns formed thereon; and
sintering the stack of the plurality of dielectric sheets having the internal electrode patterns formed thereon,
wherein each of the internal electrode patterns and dielectric sheets includes a same ceramic additive having a sintering temperature higher than a sintering temperature of a conductive metal material included in the internal electrode patterns, the internal electrode pattern is formed on only a portion of each of the plurality of dielectric sheets, the stack of the plurality of dielectric sheets includes:
- a capacitance forming region in which the plurality of internal electrode patterns are stacked; and
- a side margin region free of the internal electrode patterns and disposed adjacent to the capacitance forming region in a width direction orthogonal to a stacking direction of the plurality of dielectric sheets, and a concentration of the same ceramic additive varies in the stacking direction through the side margin region of the stack of the plurality of dielectric sheets.

21. The method of claim 20, wherein the concentration of the same ceramic additive in the side margin region is lower at locations laterally outwards from the internal electrode patterns of the capacitance forming region in the width direction than at locations laterally outwards from the dielectric sheets of the capacitance forming region in the width direction.

22. The method of claim 21, wherein each of the plurality of dielectric sheets in the capacitance forming region has a concentration of the same ceramic additive that varies in the stacking direction, and the concentration of the same ceramic additive in each dielectric sheet in the capacitance forming region is higher in a center of the dielectric sheet in the stacking direction than at locations adjacent to surfaces of the dielectric sheet contacting internal electrode patterns.

\* \* \* \* \*